United States Patent [19]

White et al.

[11] Patent Number: 5,187,128
[45] Date of Patent: * Feb. 16, 1993

[54] PROCESS FOR PREPARING SELF-SUPPORTING BODIES

[75] Inventors: Danny R. White, Elkton, Md.; Terry D. Claar, Newark, Del.

[73] Assignee: Lanxide Technology Company, LP, Newark, Del.

[*] Notice: The portion of the term of this patent subsequent to Dec. 18, 2007 has been disclaimed.

[21] Appl. No.: 551,748

[22] Filed: Jul. 12, 1990

Related U.S. Application Data

[63] Continuation-in-part of Ser. No. 449,521, Dec. 12, 1989, Pat. No. 4,978,644.

[51] Int. Cl.$^5$ .................... C04B 35/58; C04B 35/65
[52] U.S. Cl. ............................ 501/96; 501/97; 501/98; 148/317; 264/332; 264/65
[58] Field of Search ................ 501/96, 97, 98; 148/317; 264/332, 65

[56] References Cited

U.S. PATENT DOCUMENTS

| | | | |
|---|---|---|---|
| 3,758,662 | 9/1973 | Tobin | 264/332 |
| 3,864,154 | 2/1975 | Gazza et al. | 29/123 B |
| 4,353,714 | 10/1982 | Lee et al. | 419/57 X |
| 4,471,059 | 9/1984 | Yoshino et al. | 501/96 |
| 4,492,670 | 1/1985 | Mizrah et al. | 419/12 |
| 4,544,524 | 10/1985 | Mizrah et al. | 419/12 |
| 4,585,618 | 4/1986 | Fresnel et al. | 419/12 |
| 4,595,545 | 1/1986 | Sane | 269/65 |
| 4,605,440 | 8/1986 | Halverson | 75/238 |
| 4,692,418 | 8/1987 | Boecker et al. | 501/90 |
| 4,702,770 | 10/1987 | Pyzik | 75/236 |
| 4,713,360 | 12/1987 | Newkirk et al. | 501/87 |
| 4,718,941 | 1/1988 | Halverson | 75/236 |
| 4,777,014 | 10/1988 | Newkirk et al. | 419/12 |
| 4,793,968 | 12/1988 | Mosser et al. | 419/17 X |
| 4,834,938 | 5/1989 | Pyzik et al. | 419/6 |
| 4,885,130 | 12/1989 | Claar et al. | 419/12 |
| 4,885,131 | 12/1989 | Newkirk | 419/12 |
| 4,891,338 | 1/1990 | Gesing et al. | 501/87 |
| 4,904,446 | 2/1990 | White et al. | 419/13 |
| 4,915,736 | 4/1990 | Claar et al. | 75/238 |
| 4,940,679 | 7/1990 | Claar et al. | 501/96 |
| 4,978,644 | 12/1990 | White et al. | 501/96 |
| 5,004,714 | 4/1991 | Claar et al. | 501/134 |
| 5,010,044 | 4/1991 | Newkirk | 501/93 |
| 5,011,063 | 4/1991 | Claar | 228/122 |
| 5,017,334 | 5/1991 | Claar et al. | 419/12 |
| 5,019,539 | 5/1991 | Claar et al. | 501/87 |
| 5,066,622 | 11/1991 | Claar et al. | 501/87 |

FOREIGN PATENT DOCUMENTS

| | | |
|---|---|---|
| 0165707 | 12/1985 | European Pat. Off. . |
| 0193292 | 9/1986 | European Pat. Off. . |
| 0239520 | 9/1987 | European Pat. Off. . |
| 1492477 | 11/1977 | United Kingdom . |

*Primary Examiner*—Karl Group
*Attorney, Agent, or Firm*—Mark G. Mortenson; Carol A. Lewis

[57] ABSTRACT

Self-supporting bodies are produced by reactive infiltration of a parent metal into a boron nitride material typically resulting in a body comprising a boron-containing compound, a nitrogen-containing compound and metal. The mass to be infiltrated may contain one or more inert fillers admixed with the boron nitride, to produce a composite by reactive infiltration, which composite comprises a matrix which embeds the filler material. The matrix, in a composite body containing filler material, comprises one or more of metal, a boron-containing compound and a nitrogen-containing compound. The relative amounts of reactants and process conditions may be altered or controlled to yield a body containing varying volume percents of ceramic, metal and/or porosity. The mass to be infiltrated can be contained within a refractory vessel having a venting means included therein.

9 Claims, 5 Drawing Sheets

PROCESS FOR PREPARING SELF-SUPPORTING BODIES

CROSS-REFERENCE TO RELATED APPLICATIONS his application is a continuation-in-part of application Ser. No. 07/449,521, filed Dec. 12, 1989, now U.S. Pat. No. 4,978,644, in the names of Danny Ray White et al. and entitled "Process For Preparing Self-Supporting Bodies and Products Made Thereby". The disclosure of the above-identified patent application is hereby expressly incorporated by reference.

FIELD OF THE INVENTION

This invention relates generally to a novel method of preparing self-supporting bodies, nd to novel products made thereby. In its more specific aspects, this invention relates to a method of producing self-supporting bodies comprising one or more boron-containing compounds, e.g. a boride or a boride and a nitride, by reactive infiltration of a molten parent metal into a bed or mass containing boron nitride and, optionally, one or more inert fillers, to form the body.

BACKGROUND OF THE PRESENT INVENTION

In recent years, there has been an increasing interest in the use of ceramics for structural applications historically served by metals. The impetus for this interest has been the superiority of ceramics with respect to certain properties, such as corrosion resistance, hardness, wear resistance, modulus of elasticity, and refractory capabilities when compared with metals.

However, a major limitation on the use of ceramics for such purposes is the feasibility and cost of producing the desired ceramic structures. For example, the production of ceramic boride bodies by the methods of hot pressing, reaction sintering and reaction hot pressing is well known. In the case of hot pressing, fine powder particles of the desired boride are compacted at high temperatures and pressures. Reaction hot pressing involves, for example, compacting at elevated temperatures and pressures boron or a metal boride with a suitable metal-containing powder. U.S. Pat. No. 3,937,619 to Clougherty describes the preparation of a boride body by hot pressing a mixture of powdered metal with a powdered diboride, and U.S. Pat. No. 4,512,946 to Brun describes hot pressing ceramic powder with boron and a metal hydride to form a boride composite.

However, these hot pressing methods require special handling and expensive special equipment, they are limited as to the size and shape of the ceramic part produced, and they typically involve low process productivities and high manufacturing cost.

A second major limitation on the use of ceramics for structural applications is their general lack of toughness (i.e. damage tolerance or resistance to fracture). This characteristic tends to result in sudden, easily induced, catastrophic failure of ceramics in applications involving even rather moderate tensile stresses. This lack of toughness tends to be particularly common in monolithic ceramic boride bodies.

One approach to overcome this problem has been to attempt to use ceramics in combination with metals, for example, as cermets or metal matrix composites. The objective of this approach is to obtain a combination of the best properties of the ceramic (e.g. hardness and/or stiffness) and the metal (e.g. ductility). U.S. Pat. No. 4,585,618 to Fresnel, et al., discloses a method of producing a cermet whereby a bulk reaction mixture of particulate reactants, which react to produce a sintered self-sustaining ceramic body, is reacted while in contact with a molten metal. The molten metal infiltrates at least a portion of the resulting ceramic body. Exemplary of such a reaction mixture is one containing titanium, aluminum and boron oxide (all in particulate form), which is heated while in contact with a pool of molten aluminum. The reaction mixture reacts to form titanium diboride and alumina as the ceramic phase, which is infiltrated by the molten aluminum. Thus, this method uses the aluminum in the reaction mixture principally as a reducing agent. Further, the external pool of molten aluminum is not being used as a source of precursor metal for a boride forming reaction, but rather it is being utilized as a means to fill the pres in the resulting ceramic structure. This creates cermets which are wettable and resistant to molten aluminum. These cermets are particularly useful in aluminum production cells as components which contact the molten aluminum produced but preferably remain out of contact with the molten cryolite.

European Application 0,113,249 to Reeve, et al. discloses a method for making a cermet by first forming in situ dispersed particles of a ceramic phase in a molten metal phase, and then maintaining this molten condition for a time sufficient to effect formation of an intergrown ceramic network. Formation of the ceramic phase is illustrated by reacting a titanium salt with a boron salt in a molten metal such as aluminum. A ceramic boride is developed in situ and becomes an intergrown network. There is, however, no infiltration, and further, the boride is formed as a precipitate in the molten metal. Both examples in the application expressly state that no grains were formed of $TiAl_3$, $AlB_2$, or $AlB_{12}$, but rather $TiB_2$ is formed demonstrating the fact that the aluminum is not the metal precursor to the boride.

U.S. Pat. No. 3,864,154 To Gazza, et al. discloses a ceramic-metal system produced by infiltration. An $AlB_{12}$ compact was impregnated with molten aluminum under vacuum to yield a system of these components. Other materials prepared included $SiB_6$—Al, B—Al; $B_4C$—Al/Si; and $AlB_{12}$—B—Al. There is no suggestion whatsoever of a reaction, and no suggestion of making composites involving a reaction with the infiltrating metal nor of any reaction product embedding an inert filler or being part of a composite.

U.S. Pat. No. 4,605,440 to Halverson, et al., discloses that in order to obtain $B_4C$—Al composites, a $B_4C$—Al compact (formed by cold pressing a homogeneous mixture of $B_4C$ and Al powders) is subjected to sintering in either a vacuum or an argon atmosphere. There is no infiltration of molten metal from a pool or body of molten precursor metal into a preform. Further, there is no mention of a reaction product embedding an inert filler in order to obtain composites utilizing the favorable properties of the filler.

While these concepts for producing cermet materials have in some cases produced promising results, there is a general need for more effective and economical methods to prepare boride-containing materials.

DISCUSSION OF RELATED PATENTS AND PATENT APPLICATIONS

Many of the above-discussed problems associated with the production of boride-containing materials have been addressed in U.S. Pat. No. 4,885,130 (hereinafter "Patent '130"), which issued on Dec. 5, 1989, in the names of J. Dennis Clarr. et al., and is entitled "Process for Preparing Self-Supporting Bodies and Products Produced Thereby".

Briefly summarizing the disclosure of Patent '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material, is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Patent '130, a mass comprising boron carbide and, optionally, one or more of a boron donor material and a carbon donor material, is placed adjacent to or in contact with a body of molten metal or metal alloy, which is melted in a substantially inert environment within a particular temperature envelope. The molten metal infiltrates the mass comprising boron carbide and reacts with at least the boron carbide to form at least one reaction product. The boron carbide (and/or the boron donor material and/or the carbon donor material) is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted mass comprising boron carbide by a wicking or a capillary action. This transported metal forms additional parent metal, boride, carbide, and/or boro carbide and the formation or development of a ceramic body is continued until either the parent metal or mass comprising boron carbide has been consumed, or until the reaction temperature is altered to be outside of the reaction temperature envelope. The resulting structure comprises one or more of a temperature envelope. The resulting structure comprises one or more of a parent metal boride, a parent metal boro compound, a parent metal carbide, a metal (which, as discussed in Patent '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Patent '130 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass comprising boron carbide, the ratio of parent metal-boride/parent metal-carbide can be adjusted. For example, if zirconium is used as the parent metal, the ratio of $ZrB_2/ZrC$ can be reduced if a carbon donor material is utilized (i.e., more ZrC is produced due to the addition of a carbon donor material in the mass of boron carbide) while if a boron donor material is utilized, the ratio of $ZrB_2ZrC$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also affect the morphology of the resultant material.

In another related Patent, specifically, U.S. Pat. No. 4,915,736 (hereinafter referred to as "Patent '736"), issued in the names of Terry Dennis Claar and Gerhard Hans Schiroky, on Apr. 10, 1990, and entitled "A Method of Modifying Ceramic Composite Bodies By a Carburization Process and Articles Made Thereby", additional modification techniques are disclosed. Specifically, Patent '736 discloses that a ceramic composite body made in accordance with the teachings of, for example, Patent '130 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, Patent '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5-30 volume percent, such composite body could be modified by a post-carburization treatment to result in from about 0 to about 2 volume percent, typically about ½ to about 2 volume percent, of parent metal remaining in the composite body.

U.S. Pat. No. 4,885,131 (hereinafter "Patent '131"), issued in the name of Marc S. Newkirk on Dec. 5, 1989, and entitled "Process For Preparing Self-Supporting Bodies and Products Produced Thereby", discloses additional reactive infiltration formation techniques. Specifically, Patent '131 discloses that self-supporting bodies can be produced by a reactive infiltration of a parent metal into a mixture of a bed or mass comprising a boron donor material and a carbon donor material. The relative amounts of reactants and process conditions may be altered or controlled to yield a body containing varying volume percents of ceramic, metals, ratios of one ceramic or another and porosity.

In another related patent application, specifically, copending U.S. patent application Ser. No. 07/296,770 (hereinafter referred to as "Application '770"), filed in the names of Terry Denis Claar et al., on Jan. 13, 1989, and entitled "A Method of Producing Ceramic Composite Bodies", additional reactive infiltration formation techniques are disclosed. Specifically, Application '770 discloses various techniques for shaping a bed or mass comprising boron carbide into a predetermined shape and thereafter reactively infiltrating the bed or mass comprising boron carbide to form a self-supporting body of a desired size and shape.

U.S. Pat. No. 5,011,063, which issued on Apr. 30, 1991, from U.S. patent application Ser. No. 07/560,491, filed Jul. 23, 1990, which is a continuation of U.S. patent application Ser. No. 07/296,837 (hereinafter referred to as "Patent '063"), filed in the name of Terry Dennis Claar on Jan. 13, 1989, and entitled "A Method of Bonding A Ceramic Composite Body to a Second Body and Articles Produced Thereby", discloses various bonding techniques for bonding self-supporting bodies to second materials. Particularly, this patent discloses that a bed or mass comprising one or more boron-containing compounds is reactively infiltrated by a molten parent metal to produce a self-supporting body. Moreover, residual or excess metal is permitted to remain bonded to the formed self-supporting body. The excess metal is utilized to form a bond between the formed self-supporting body and another body (e.g., a metal body or a ceramic body of any particular size or shape).

The reactive infiltration of a parent metal into a bed or mass comprising boron nitride is disclosed in U.S. Pat. No. 4,904,446 (hereinafter "Patent '446"), issued in the names of Danny Ray White et al., on Feb. 27, 1990, and entitled "Process for Preparing Self-Supporting Bodies and Produces Made Thereby". Specifically, this patent discloses that a bed or mass comprising boron nitride can be reactively infiltrated by a parent metal. A relative amount of reactants and process conditions may be altered or controlled to yield a body containing varying volume percents of ceramic, metal and/or porosity. Additionally, the self-supporting body which results comprises a boron-containing compound, a nitrogen-containing compound and, optionally, a metal. Additionally, inert fillers may be included in the formed self-supporting body.

A further post-treatment process for modifying the properties of produced ceramic composite bodies is disclosed in U.S. Pat. No. 5,004,714 (hereinafter "Patent '714"), which issued on Apr. 2, 1991, from U.S. patent application Ser. No. 07/296,966 (Patent '714), filed in the names of Terry Dennis Claar et al., on Jan. 13, 1989, and entitled "A Method of Modifying Ceramic Composite Bodies By Post-Treatment Process and Articles Produced Thereby". Specifically, Application '966 discloses that self-supporting bodies produced by a reactive infiltration technique can be post-treated by exposing the formed bodies to one or more metals and heating the exposed bodies to modify at least one property of the previously formed composite body. One specific example of a post-treatment modification step includes exposing a formed body to a siliconizing environment.

U.S. Pat. No. 5,019,539, (hereinafter "Patent '539"), which issued on May 28, 1991, from U.S. patent application Ser. No. 07/296,961, filed in the names of Terry Dennis Claar et al., on Jan. 13, 1989, and entitled "A Process for Preparing Self-Supporting Bodies Having Controlled Porosity and Graded Properties and Products Produced Thereby", discloses reacting a mixture of powdered parent metal with a bed or mass comprising boron carbide and, optionally, one or more inert fillers. Additionally, it is disclosed that both a powdered parent metal and a body or pool of molten parent metal can be induced to react with a bed or mass comprising boron carbide. The body which is produced is a body which has controlled or graded properties.

The disclosures of each of the above-discussed Commonly Owned U.S. patent applications and Patents are herein expressly incorporated by reference.

SUMMARY OF THE INVENTION

In accordance with the present invention, self-supporting ceramic bodies are produced utilizing a parent metal infiltration and reaction process (i.e. reactive infiltration) in the presence of boron nitride. A bed or mass of boron nitride is infiltrated by molten parent metal, and the bed may be comprised entirely of boron nitride, resulting in a self-supporting body comprising one or more parent metal boron-containing compounds, which compounds include a parent metal boride or a parent metal nitride, or both. Alternatively, the mass to be infiltrated may contain one or more inert fillers admixed with the boron nitride to produce a composite by reactive infiltration, which composite comprises a matrix of one or more boron-containing compounds and also may include a parent metal nitride and residual unreacted or unoxidized constituents of the parent metal. In certain embodiments of the present invention, the filler material may be embedded by a matrix comprising parent metal boron-containing compounds, parent metal nitrogen-containing compounds and unreacted or unoxidized parent metal. In both embodiments, the final product may include a metal as one or more metallic constituents of the parent metal. Still further, in some cases it may be desirable to add a carbon donor material (i.e., a carbon-containing compound) to the boron nitride, the carbon donor material being capable of reacting with the parent metal to form a parent metal-carbide phase, thereby modifying resultant mechanical properties of the composite body. The reactant concentrations and process conditions may be altered or controlled to yield a body containing varying volume percents of ceramic compounds, metal and/or porosity.

Broadly, in the method of this invention, a mass comprising boron nitride is placed adjacent to or contacted with a body of molten metal or metal alloy, which is melted in a substantially inert environment within a particular temperature envelope. The molten metal infiltrates the mass and reacts with the boron nitride to form one or more reaction products. The boron nitride is reducible, at least in part, by the molten parent metal to form the parent metal boron-containing compound, e.g. a parent metal boride and/or boro compound, under the temperature conditions of the process. Typically a parent metal nitride is also produced. At least a portion of the reaction product is maintained in contact with the metal, and molten metal is drawn or transported toward the unreacted boron nitride by wicking or capillary action. This transported metal forms additional parent metal boride and nitride, and the formation or development of a ceramic body is continued until the parent metal or boron nitride has been consumed, or until the reaction temperature is altered to be outside the reaction temperature envelope. The resulting structure comprises one or more of a parent metal boride, a parent metal boro compound, a parent metal nitride, a metal (which as used herein is intended to include alloys and intermetallics), or voids, or a combination thereof, and these several phases may or may not be interconnected in one or more dimensions. The final volume fractions of the boron-containing compounds (i.e. boride and boro compounds), nitrogen-containing compounds, and metallic phases, and the degree of interconnectivity, can be controlled by changing one or more conditions, such as the initial density of the boron nitride body, the particle size distribution of the boron nitride powder, the relative amounts of boron nitride and parent metal, alloying the parent metal, dilution of the boron nitride with a filler, temperature and time.

Moreover, by adding a carbon donor material (e.g., graphite powder or carbon black) to the mass of boron nitride, a parent metal carbide phase may be formed which may modify or enhance one or more properties of the final body.

Typically, the mass of boron nitride will be at least somewhat porous so as to allow for wicking the parent metal through the reaction product. Wicking occurs apparently either because any volume change on reaction does not fully close off pores through which parent metal can continue to wick, or because the reaction product remains permeable to the molten metal due to such factors as surface energy considerations which render at least some of its grain boundaries permeable to the parent metal.

In another embodiment, a composite is produced by the transport of molten parent metal into a bedding of boron nitride admixed with one or more inert filler materials. In this embodiment, boron nitride is incorporated into a suitable filler material, which then is placed adjacent to or in contact with the molten parent metal. This setup may be supported on or in a separate bed that is substantially non-wettable by and non-reactive with the molten metal under the process conditions. The molten parent metal infiltrates the boron nitride-filler mixture and reacts with the boron nitride to form one or more boron-containing compounds. The resulting self-supporting ceramic-metal composite typically is a dense microstructure which comprises a filler embedded by a matrix comprising boron-containing compound(s), and also may include a substantial quantity of a nitride and metal. Only a small amount of boron nitride is required to promote the reactive infiltration process. Thus, the resulting matrix can vary in content from one composed primarily of metallic constituents, thereby exhibiting certain properties characteristic of the parent metal; to cases where a high concentration of the boron nitride is used in the process, thereby producing either a significant boron-containing compound(s) phase or a significant nitrogen-containing compound(s) phase, or both, which dominate the properties of the matrix. The filler may serve to enhance the properties of the composite, lower the raw materials cost of the composite, or moderate the kinetics of the boron-containing compound(s) and/or nitrogen-containing compound(s) formation reactions and the associated rate of heat evolution.

In a further embodiment, the material to be infiltrated is shaped into a preform corresponding to the geometry of the desired final composite. Subsequent reactive infiltration of the preform by the molten parent metal results in a composite having the net shape or near net shape of the preform, thereby minimizing expensive final machining and finishing operations. Moreover, to assist in reducing the amount of final machining and finishing operations, a barrier material can surround the preform. The use of a graphite mold is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the present invention, is reduced. Typically, a plurality of holes is placed in a bottom portion of the mold, or that portion of the mold toward which reactive infiltration occurs. The holes function as a vengint means which permit the removal of, for example, argon gas which has been trapped in the preform as the parent metal reactive infiltration front infiltrates the preform.

Still further, the procedures discussed above herein in the Section "Discussion of Related Patents and Patent Applications" may be applicable in this invention.

DEFINITIONS

As used in this specification and the appended claims, the terms below are defined as follows:

"Parent metal" refers to that metal, e.g. zirconium, which is the precursor for the polycrystalline oxidation reaction product, that is, the parent metal boride, parent metal nitride, or other parent metal compound, and includes that metal as a pure or relatively pure metal, a commercially available metal having impurities and/or alloying constituents therein, and an alloy in which that metal precursor is the major constituent; and when a specific metal is mentioned as the parent metal, e.g. zirconium, the metal identified should be read with this definition in mind unless indicated otherwise by the context.

"Parent metal boride" and "parent metal boro compounds" mean a reaction product containing boron formed upon reaction between boron nitride and the parent metal and includes a binary compound of boron with the parent metal as well as ternary or higher order compounds.

"Parent metal nitride" means a reaction product containing nitrogen formed upon reaction of boron nitride and parent metal.

"Parent metal carbide" means a reaction product containing carbon formed upon reaction of a carbon source and parent metal.

DETAILED DESCRIPTION OF THE INVENTION AND PREFERRED EMBODIMENTS

Figure 1:
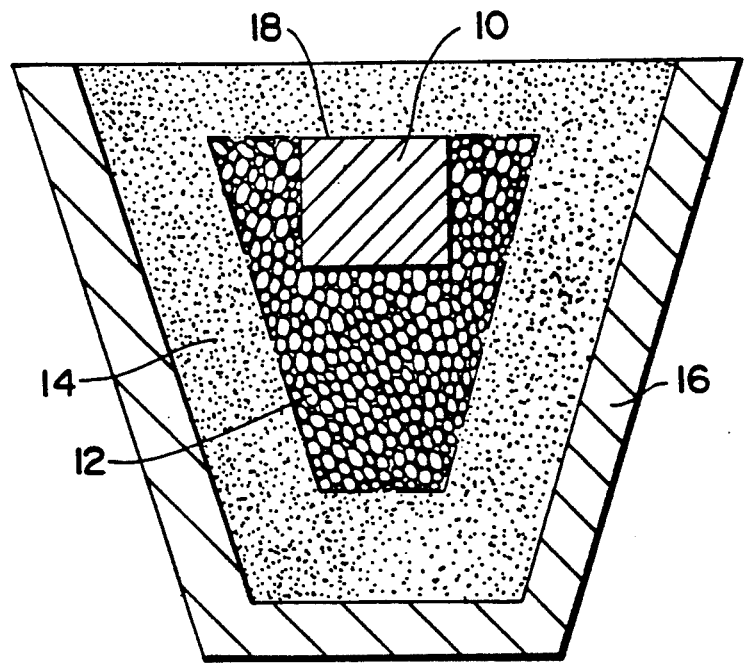
FIG. 1 is a schematic cross-section of an assembly utilized to form a body according to the present invention.

In accordance with the invention, a self-supporting body is produced by the reactive infiltration of a molten parent metal into a mass comprising boron nitride to form a polycrystalline ceramic-containing body comprising the reaction product(s) of the parent metal with boron nitride, and also may include one or more constituents of the parent metal. The boron nitride, typically a solid at the process conditions, is preferably in fine particulate or powdered form. The environment or atmosphere for the process is chosen to be relatively inert or nonreactive under the process conditions. Argon or vacuum, for example, would be suitable process atmospheres. The resulting product comprises one or more of (a) a parent metal boride, (b) a boro compound, (c) a parent metal nitride, and (d) metal. The constituents and proportions in the product depend largely on the choice and composition of parent metal and the reaction conditions. Also, the self-supporting body produced may exhibit porosity or voids.

In the preferred embodiments of the present invention, the parent metal and a mass or bedding of boron nitride are positioned adjacent each other so that reactive infiltration will be in the direction towards and into the bedding. The bedding, which may be preshaped, may include a filler material, such as a reinforcing filler, which is substantially inert under the process conditions. This filler material is usually embedded by a matrix comprising the reaction products formed from the reaction between the parent metal and the boron nitride, and the matrix may also contain unoxidized or unreacted constituents of the parent metal. The reaction product can grow into the bedding without substantially disturbing or displacing it. Thus, no external forces are required which might damage or disturb the arrangement of the bedding and no awkward or costly high temperature, high pressure processes and facilities are required to create the reaction product. Reactive infiltration of the parent metal into and with a mass of filler material containing boron nitride, which preferably is in particulate or powdered form, forms a composite typically comprising filler material and parent metal borides and parent metal nitrides. With aluminum as the parent metal, in addition to the filler material, the product may comprise borides or nitrides of aluminum, and also may include unreacted parent metal, e.g. aluminum, and possibly other unreacted or unoxidized constituents of the parent metal. If zirconium is the parent metal, the resulting composite may comprise, in addition to the filler material, borides or carbides of zirconium, and also may include unreacted or unoxidized parent metal or constituents of the parent metal.

Although the present invention is hereinafter described with particular reference to certain preferred embodiments in which the parent metal is zirconium or aluminum, this is for illustrative purposes only. Other parent metals also may be used such as silicon, titanium, hafnium, lanthanum, iron, calcium, vanadium, niobium, magnesium, tantalum, chromium, molybdenum, tungsten and beryllium, and examples for several such parent metals are given below.

Referring to FIG. 1, the parent metal 10 as the precursor, e.g. zirconium, is formed into an ingot, billet, rod, plate, or the like. The metal is at least partially embedded in particulate boron nitride 12. This setup or assembly is surrounded by an inert material 14, typically in particulate form, which is non-wettable by and non-reactive with the molten metal under the process conditions, and contained within a crucible 16 or other refractory vessel. The top surface 18 of the parent metal may be exposed, or the parent metal may be completely embedded or surrounded by the boron nitride, and also the inert bed 14 may be omitted. This assembly is placed in a furnace and heated, preferably in an inert atmosphere such as argon, above the melting point of the parent metal but preferably below the melting point of the desired reaction product so as to form a body or pool of molten metal. It should be understood that the operable temperature range or preferred temperature may not extend over this entire interval. The temperature range will depend largely upon such factors as the composition of the parent metal and the desired phases in the resulting composite. Molten metal contacts the boron nitride, and a parent metal boride (e.g. zirconium diboride) and/or a parent metal nitride (e.g., zirconium nitride) are formed as the reaction product. Upon continued exposure to the boron nitride, the remaining molten metal is progressively drawn through the reaction product in the direction of and into the mass containing the boron nitride, to provide continued formation of reaction product at the interface between the molten metal and boron nitride. The product produced by this method comprises the reaction product(s) of the parent metal with the boron nitride, or may comprise a ceramic-metal composite to include further one or more unreacted or non-oxidized constituents of the parent metal. A substantial amount of the boron nitride is reacted to form the reaction product(s), preferably this amount being at least about 25%. The ceramic crystallites formed as the reaction product by the process may or may not be interconnected, but preferably are interconnected in three dimensions, and the metallic phases and any voids in the product are normally at least partially interconnected. Any porosity tends to result from a partial or nearly complete depletion of the parent metallic phase in favor of the formation of additional reaction product (as in the case where boron nitride is present in at least a stoichiometric amount), but the volume percent of voids will depend on such factors as temperature, time, type of parent metal, and the porosity of the mass of boron nitride.

It has been observed that products made in accordance with this invention using zirconium, titanium and hafnium as the parent metal form a parent metal boride characterized by a platelet-like structure. These platelets typically are unaligned or randomly oriented and may increase the fracture toughness of the body because of crack deflection and/or pull-out mechanisms.

In another aspect of the invention, there is provided a self-supporting body, including composite bodies, comprising a matrix of reaction product, and, optionally metallic constituents, embedding a substantially inert filler. The matrix is formed by the reactive infiltration of a parent metal into a bed or mass of the filler intimately mixed with boron nitride. The filler material may be of any size or shape, and may be oriented with respect to the parent metal in any manner as long as the direction of development of the reaction product will be towards and will engulf at least a portion of the filler material without substantially disturbing or displacing the filler may be composed of or comprise any suitable material, such as ceramic and/or metal fibers, whiskers, particulates, powders, rods, wires, wire cloth, refractory cloth, plates, platelets, reticulated foam structure, solid or hollow spheres, etc. A particularly useful filler is alumina, but other oxides and ceramic fillers may be used depending on the starting materials and the end properties desired. The volume of filler material may be a loose or bonded array or arrangement, which array has interstices, openings, intervening spaces, or the like, to render the filler material permeable to the infiltration of molten parent metal. Further, the filler material may be homogeneous or heterogeneous. If desired, these materials may be bonded with any suitable binding agent (e.g. Avicil PH 105, from FMC Co.) which does not interfere with the reactions of this invention or leave any undesirable residual by-products within the final composite product. A filler which would tend to react excessively with the boron nitride or with the molten metal during processing may be coated so as to render the filler inert to the process environment. For example, carbon fiber, if used as a filler in conjunction with aluminum as the parent metal will tend to react with molten aluminum, but this reaction can be avoided if the fiber is first coated, e.g. with alumina.

Figure 3:
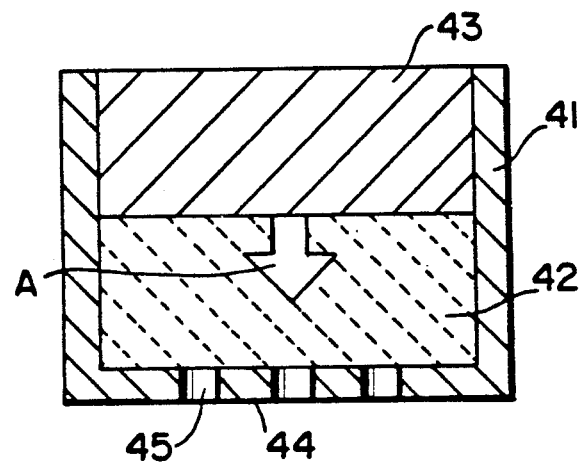
FIGS. 3 and 4 show a novel graphite mold for use with the invention.
Figure 4:
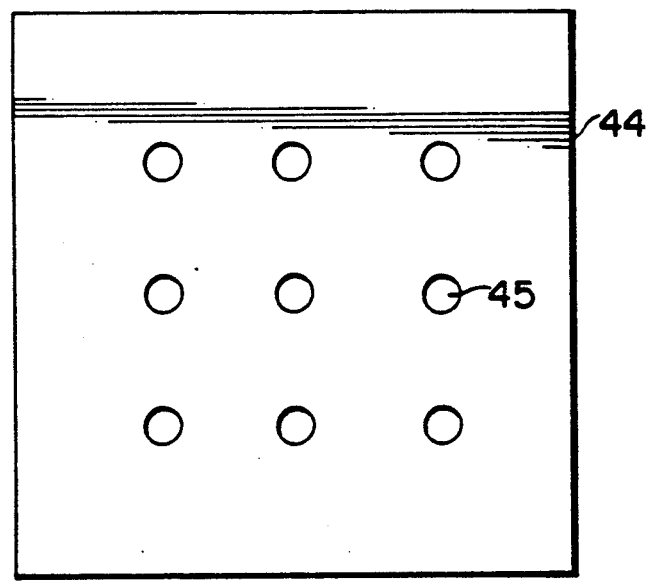

A suitable refractory container holding the parent metal and a bed or volume of filler with admixed boron nitride properly oriented to permit reactive infiltration of the parent metal into the filler bed and proper development of the composite, is placed in a furnace, and this lay-up is heated to a temperature above the melting point of the parent metal. At these elevated temperatures, the molten parent metal infiltrates the permeable filler by a wicking process and reacts with the boron nitride, thereby producing the desired ceramic or ceramic-metal composite body. Moreover, to assist in reducing the amount of final machining and finishing operations, a barrier material can surround the preform. The use of a graphite mold is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the present invention, is reduced. Typically, a plurality of holes is placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform. FIG. 3 and FIG. 4 show a preform 42 in contact with a parent metal ingot 43, both of which are contained in a graphite refractory vessel 41. The graphite refractory vessel 41 has a bottom portion 44 having therein a plurality of through-holes 45 which function as a venting means. The through-holes 45 permit any gas trapped in the preform (e.g., argon) to escape as the parent metal reactive infiltration front infiltrates the preform (i.e., the reactive infiltration front penetrates the preform in the direction of the arrow "A" in FIG. 3). Thus, porosity in the formed composite body can be reduced.

Figure 2:
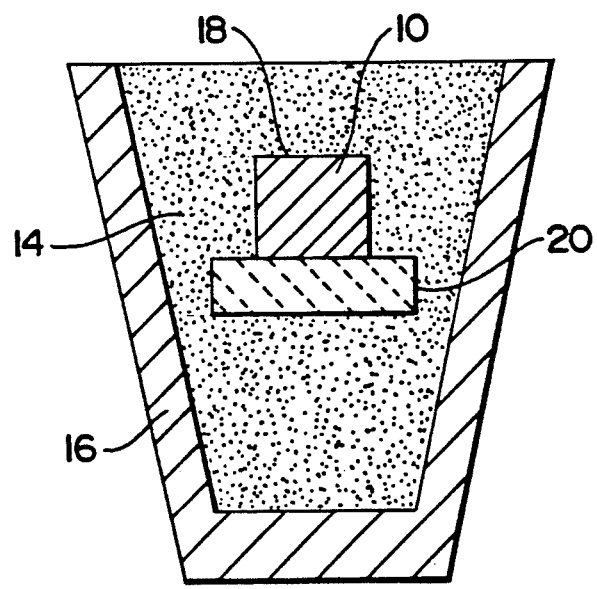
FIG. 2 is a schematic cross-section of an assembly utilized to form a body according to the present invention.

A setup which can be utilized to produce the bodies of this invention is illustrated in FIG. 2. The boron nitride, together with any desired inert filler materials, is fabricated into a preform with a shape corresponding to the desired geometry of the final composite. The preform 20 is superimposed with the parent metal precursor 10 and the assembly is surrounded by the inert material 14 contained within the crucible 16. The top surface 18 of the parent metal may or may not be exposed. The preform 20 may be prepared by any of a wide range of conventional ceramic body formation methods (such as uniaxial pressing, isostatic pressing, slip casting, sedimentation casting, tape casting, injection molding, filament winding for fibrous materials, etc.) depending on the characteristics of the filler. Initial bonding of the filler particles, whiskers, fibers, or the like, prior to reactive infiltration may be obtained through light sintering or by use of various organic or inorganic binder materials which do not interfere with the process or contribute undesirable by-products to the finished material. The preform 20 is manufactured to have sufficient shape integrity and green strength, and should be permeable to the transport of molten metal, preferably having a porosity of between about 5 and 90% by volume and more preferably between about 25 and 75% by volume. In the case of an aluminum parent metal, suitable filler materials include, for example, silicon carbide, titanium diboride, alumina and aluminum dodecaboride (among others), and as particulates typically having a mesh size of from about 14 to 1000, but any admixture of filler materials and mesh sizes may be used. The preform 20 is then contacted with molten parent metal on one or more of its surfaces for a time sufficient to complete infiltration of the matrix to the surface boundaries of the preform. The result of this preform method is a ceramic-metal composite body of a shape closely or exactly representing that desired in the final product, thus minimizing or eliminating expensive final machining or grinding operations.

A wide variation of boron nitride concentrations can be provided in the filler, but the lower the concentration of boron nitride, the higher the volume percent of metal in the matrix. When very low amounts of the boron nitride are used, the resulting matrix is interconnected metal and a limited amount of parent metal boride and parent metal nitride dispersed in the metal. In the absence of boron nitride, reactive infiltration of the filler may not occur, and infiltration may not be possible without special procedures, such as the application of external pressure to force the metal into the filler.

Because a wide range of boron nitride concentrations in the filler can be used in the process of this invention, it is possible to control or to modify the properties of the completed product by varying the concentration of boron nitride and/or the composition of the bed. When only a small amount of boron nitride is present relative to the amount of parent metal, such that the mass comprises a low density of boron nitride, the composite body or matrix properties are dominated by the properties of the parent metal, most typically ductility and toughness, because the matrix is predominantly metal. Such a product may be advantageous for low or mid-range temperature applications. When a large amount of boron nitride is used, as for example when compound(s) having boron nitride particles are densely packed around a filler material or occupy a high percentage of space between constituents of the filler, the resulting body or matrix properties tend to be dominated by the parent metal boride and parent metal nitride, in that the body or matrix would be harder or less ductile or less tough. If the stoichiometry is closely controlled so as to achieve substantially complete conversion of the parent metal, the resulting product will contain little or no metal, which may be advantageous for high temperature applications of the product. Also, the substantially complete conversion of the parent metal could be significant especially in some high temperature applications, because the boride reaction product is more stable than boron nitride in that boron nitride will tend to react with residual or unoxidized metal, e.g. aluminum, present in the product.

In one embodiment of the present invention, $TiB_2$ is added to the boron nitride to obtain a final body having a higher boride content. This technique can be utilized with other compounds which might affect or enhance the properties of the final body. For example, $AlB_{12}$ could be added to the boron nitride in order to create more parent metal boride in the final product and, in addition, the aluminum metal released from the reaction between the $AlB_{12}$ and parent metal could alloy, or form intermetallics, with the parent metal, thus affecting or enhancing the properties of the final body.

In another embodiment of the present invention, a solid oxidant could be added to the boron nitride bed to permit enhanced infiltration.

Also, elemental boron may be admixed with the boron nitride bed (including a bed with filler) to facilitate reactive infiltration, particularly when using aluminum as the parent metal.

Additional variations in the characteristics and properties of the composite can be created by controlling the infiltration conditions. Variables which can be manipulated include the nature and size of the particles of boron nitride material, and the temperature and time of infiltration. For example, reactive infiltration involving large boron nitride particles and minimum exposure times at low temperatures will result in a partial conversion of the boron nitride to parent metal boron and parent metal nitrogen containing compound(s). As a consequence, unreacted boron nitride material remains in the microstructure, which may impart desirable properties to the finished material for some purposes. Infiltration involving the boron nitride particles, high temperatures and prolonged exposure times (perhaps even to hold at temperature after infiltration is complete) will tend to favor substantially complete conversion of the parent metal to the parent metal boride and nitride compound(s). Preferably, conversion of the boron nitride to the parent metal boride, and parent metal nitride is at least about 25%. Infiltration at high temperatures (or a subsequent high temperature treatment) also may result in densification of some of the composite constituents by a sintering process. In addition, as noted previously, the reduction of the amount of available parent metal below that necessary to form the parent metal boride and nitride compound(s) and fill the resulting interstices in the material may result in a porous body which also could have useful applications. In such a composite, porosity may vary from about 1 to 25 volume percent, and sometimes higher, depending upon the several factors or conditions enumerated above.

The following Examples illustrate the novel reaction products of this invention and the method by which they are prepared; however, these Examples are illustrative only and they are not intended to limit the invention claimed.

EXAMPLE 1

The following example demonstrates the reactive infiltration of a titanium parent metal into a boron nitride bedding.

A cylindrical ingot of commercially pure titanium having approximate dimensions of 1 inch in diameter and 1½ inches tall was embedded within a mass of particulate boron nitride (approximate particle size 150 micron) contained within an alumina crucible.

The assembly, consisting of the alumina crucible and its contents, was placed in an induction furnace supplied with argon gas flowing at 300 cc/minute. The assembly was heated from room temperature to about 1700° C. and maintained at about 1700° C. for approximately 30 minutes. After the 30 minute heating period, the furnace was turned off and the assembly was allowed to cool within the furnace for about 1 hour prior to removal from the furnace.

A visual examination of the assembly indicated that the titanium parent metal had reactively infiltrated the boron nitride bedding to form a self-supporting body. A powdered sample of an interior section of the self-supporting body was subjected to X-ray diffraction analysis and this analysis showed the presence of compounds of titanium with nitrogen and boron (such as $Ti_2N$, TiB and possibly TiN), thus confirming that the titanium parent metal had reacted with the boron nitride bedding material.

Figure 5:
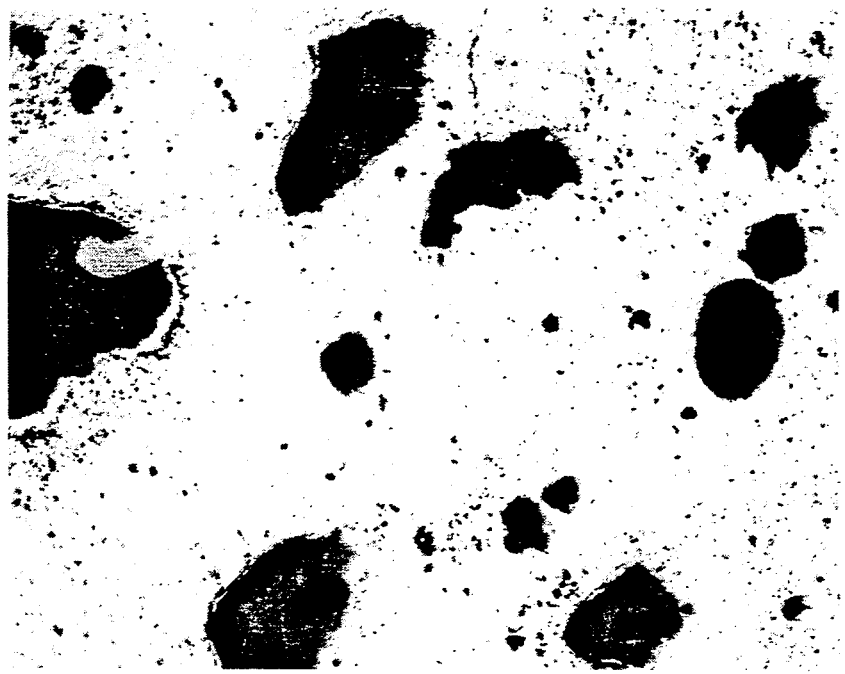
FIG. 5 is a photomicrograph taken at 50 X of a cross-section of a body produced in accordance with Example 1.
Figure 6:
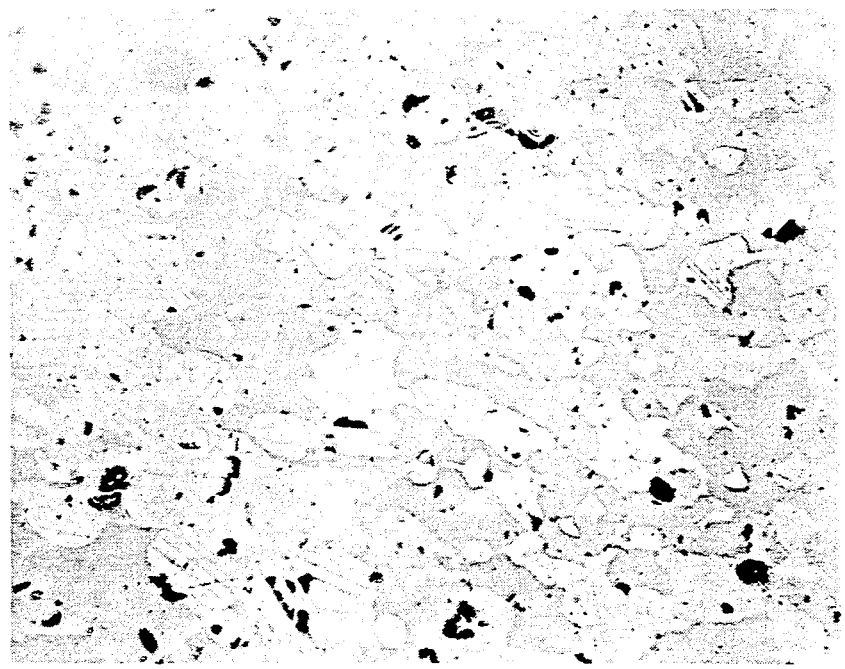
FIG. 6 is a photomicrograph taken at 400 X of a cross-section of a body produced according to Example 1.

FIG. 5 is a photomicrograph at 50× magnification of a cross-section of the self-supporting body produced in this example. FIG. 6 is a photomicrograph at 400× magnification of a cross-section of the self-supporting body produced in this example.

EXAMPLE 2

The following example demonstrates the reactive infiltration of a titanium parent metal into a bedding of boron nitride mixed with aluminum powder.

A cylindrical ingot of commercially pure titanium having approximate dimensions of 1 inch diameter by 1.5 inches tall was embedded within a particulate bedding material comprising about 89.5 grams of 150 micron boron nitride powder and about 22.4 grams of aluminum powder. The bedding material was contained within an alumina crucible.

The assembly, consisting of the alumina crucible and its contents, was placed within an induction furnace supplied with argon gas flowing at approximately 500 cc/minute. The assembly was heated from room temperature to about 1700° C. and maintained at 1700° C. for approximately 30 minutes. After the 30 minute heating period, the furnace was turned off and the assembly was allowed to cool within the furnace for approximately 1 hour.

A visual examination of the assembly indicated that the titanium parent metal had reactively infiltrated the boron nitride/aluminum mixture to form a self-supporting body. A powdered sample of an interior section of this body was subjected to X-ray diffraction analysis. This analysis showed the presence of compounds of titanium with nitrogen and boron (such as TiN, $TiB_2$ and TiB), thus confirming that the titanium parent metal had reacted with the boron nitride bedding material. This analysis also showed at least trace amounts of $AlB_{10}$, which indicates that the aluminum in the bedding material reacted with either the boron nitride or with dissociated boron.

Figure 7:
FIG. 7 is a photomicrograph taken at 400 X of a cross-section of a sample produced according to Example 2.

FIG. 7 is a photomicrograph at 400× magnification of a cross-section of the self-supporting body produced in this example.

EXAMPLE 3

The following example demonstrates the reactive infiltration of a zirconium parent metal into a bed of particulate boron nitride.

A cylindrical ingot of commercially pure zirconium parent metal having approximate dimensions 1 inch diameter by 1.5 inches tall was embedded within a mass of particulate boron nitride (approximate particle size 150 micron) contained within an alumina crucible.

The assembly, consisting of the alumina crucible and its contents, was placed in an induction furnace supplied with argon gas flowing at approximately 500 cc/minute. The assembly was heated from temperature to about 1900° C. and maintained at 1900° C. for approximately one hour. After the one hour heating period, the furnace was turned off and the assembly was allowed to cool within the furnace for approximately 1 hour.

A visual examination of the assembly indicated that the zirconium metal had reactively infiltrated the boron nitride bed to form a self-supporting body.

EXAMPLE 4

The following example demonstrates the reactive infiltration of a zirconium parent metal into a bed of particulate boron nitride.

A cylindrical ingot of Grade 702 zirconium from Teledyne-Wah-Chang-Albany, (Albany, Oreg.) having approximate dimensions of ⅝ inch in diameter by ¾ inch tall was embedded in a porous mass of UCAR HMC particulate boron nitride (particle size smaller than 48 mesh and larger than 200 mesh) contained within a graphite crucible. The upper surface of the ingot was left exposed to the atmosphere.

The assembly, consisting of the graphite crucible and its contents, was placed in an electrical resistance heated furnace supplied with argon gas flowing at approximately 500 cc/minute. The assembly was heated to a temperature of about 1900° C. over a period of approximately four hours and then maintained at about 1900° C. for about one hour. Before being removed from the furnace, the assembly was allowed to cool for approximately 12 hours.

Figure 8:
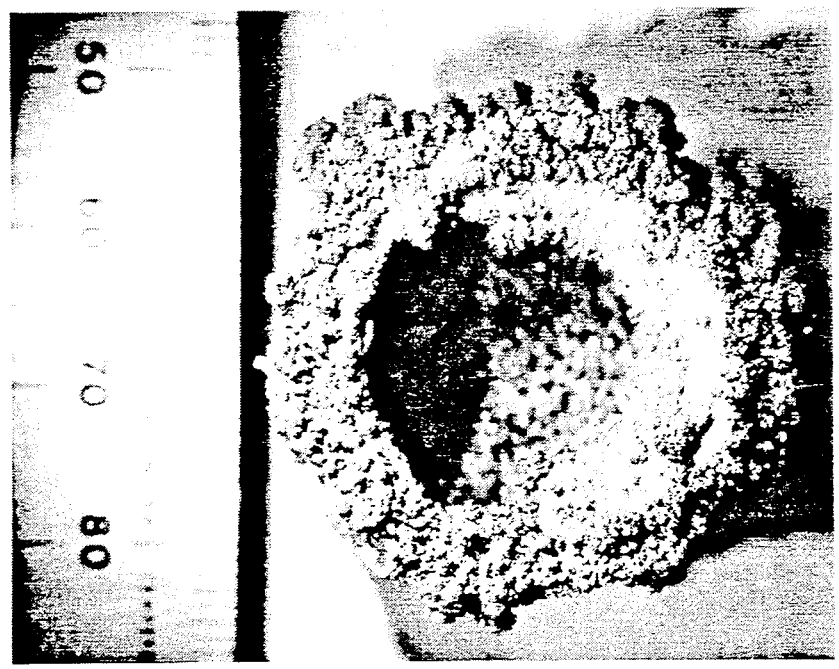
FIG. 8 shows a sample produced in accordance with Example 4.

A visual examination of the assembly indicated that the zirconium parent metal had reactively infiltrated the boron nitride bed to form a self-supporting body having an interior cavity which replicated the shape of the cylindrical zirconium ingot, as shown in FIG. 8. A powered sample of an interior section of the body was subjected to X-ray diffraction analysis. This analysis showed the presence of at least one compound of zirconium with boron ($ZrB_2$), thus confirming that the zirconium parent metal had reacted with the boron nitride bedding material.

EXAMPLE 5

The following example demonstrates the reactive infiltration of titanium into a bed of particulate boron nitride.

A cylindrical ingot of Grade 2 titanium having approximate dimensions of 1 inch diameter by ⅝ inch height was placed on top of an approximately ½ inch thick by 1 inch diameter cylindrical preform of HTP-40 boron nitride (particle size smaller than 40 mesh and larger than 150 mesh), contained within a graphite crucible having a 1 inch inner diameter. The preform was formed by placing a layer of the boron nitride particulate within the graphite crucible and subjecting the boron nitride layer to vibratory packing for about 2 minutes. A small metal weight was placed on top of the boron nitride layer before the packing procedure was initiated in order to facilitate the densification of the boron nitride layer. No binder was utilized to produce the preform. The assembly, consisting of the graphite crucible and its contents, was placed within an electrical resistance heated furnace supplied with argon gas flowing at 500 cc/minute. The assembly was heated from room temperature to about 1750° C. over a period of approximately 3 hours. The assembly was maintained at about 1750° C. for approximately 2 hours. After this two hour heating period, the assembly was allowed to cool within the furnace for about 12 hours prior to removal from the furnace.

A visual examination of the assembly indicated that the titanium parent metal had reactively infiltrated the boron nitride preform to form a self-supporting body. A powdered sample of an interior section of the body was subjected to X-ray diffraction analysis. This analysis showed the presence of compounds of titanium with nitrogen and boron (such as $Ti_2N$ and TiB), thus confirming that the titanium parent metal had reacted with the boron nitride bedding material.

EXAMPLE 6

The following example demonstrates the reactive infiltration of a titanium parent metal into a bed of particulate boron nitride.

A cylindrical ingot of Grade 2 titanium having approximate dimensions of ⅝ inch in diameter by ½ inch tall was embedded within a mass of particulate boron nitride (UCAR HCM BN from Union Carbide, particle size smaller than 48 mesh and larger than 200 mesh) contained within an alumina crucible. The upper surface of the titanium ingot was exposed to the atmosphere. The assembly, consisting of the alumina crucible and its contents, was placed within an electrical resistance heated furnace supplied with argon gas flowing at about 1 liter/minute. The assembly was heated to about 1750° C. in approximately 4.5 hours, at which time the argon gas was replaced with forming gas (approximately 96% by volume $N_2$ gas and 4% by volume $H_2$ gas) flowing at about one liter/minute. The assembly was then maintained in the flowing forming gas at about 1750° C. for about four hours.

Figure 9:
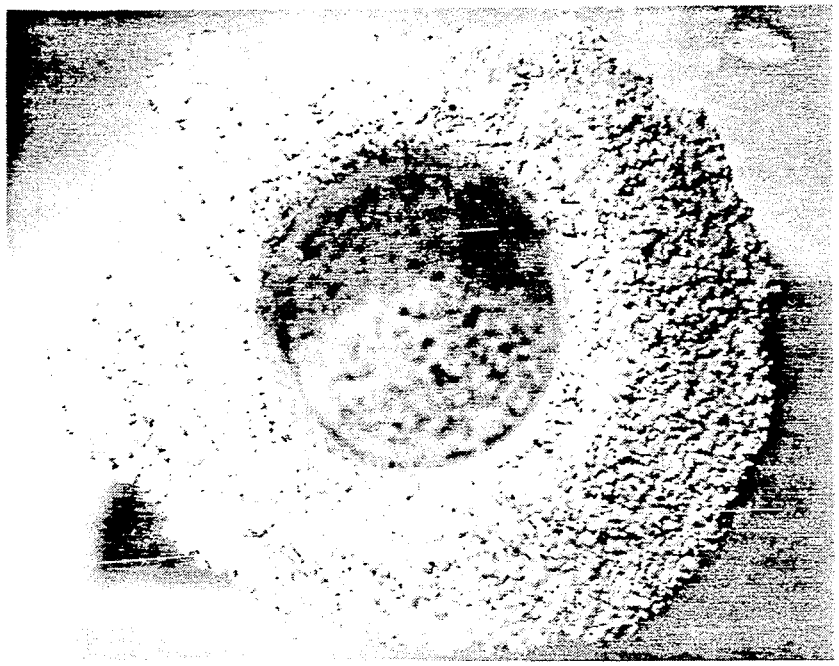
FIG. 9 shows a sample produced in accordance with Example 6.

The assembly was removed from the furnace after cooling for about 12 hours and visually examined. The examination indicated that the titanium parent metal had reactively infiltrated the boron nitride bed to form a self-supporting body having an interior cavity which, as shown in FIG. 9, closely replicated the exterior surface of the cylindrical ingot of titanium.

A powdered sample of an interior section of the body was subjected to X-ray diffraction analysis. This analysis showed the presence of compounds of titanium with boron and nitrogen (such as $TiB_2$ and TiN), thus confirming that the titanium parent metal had reacted with the boron nitride bedding material.

EXAMPLE 7

The following example demonstrates the formation of a self-supporting body upon reaction between titanium parent metal and a boron nitride bedding.

An approximately 17.34 gram cylindrical ingot of Grade 2 titanium metal having approximate dimensions of ⅝ inch diameter and ¾ inch high was embedded within a 22.5 gram mass of boron nitride (UCAR HCM BN from Union Carbide, particle size smaller than 48 mesh and larger than 200 mesh) contained within a graphite cup. The graphite cup and its contents were placed within an alumina crucible upon a 24 grit alumina bedding (38 Alundum, Norton Co.).

The assembly, consisting of the alumina crucible and its contents, was placed in a vacuum/inert atmosphere furnace supplied with flowing argon gas at a rate of approximately 500 cc/minute. The temperature was raised from room temperature to about 1750° C. at a rate of about 200° C. per hour and held at about 1750° C. for about 4 hours.

A visual examination of the sample indicted that the titanium parent metal had reactively infiltrated the boron nitriding bedding to form a self-supporting composite body. A powdered sample of the resultant composite body was taken from an interior portion of the compound and was subjected to X-ray diffraction analysis. This analysis showed the presence of compounds containing titanium, boron, and/or nitrogen (e.g., $TiB_2$ and TiN), as well as some unreacted boron nitride.

Moreover, a comparison of this Example to Example 6 above demonstrates that a specific substantially nonreactive atmosphere is not required to form self-supporting bodies by the method of the present invention. Specifically, this Example utilized a substantially inert atmosphere (i.e., argon) whereas Example 6 above utilized an atmosphere comprising forming gas. A comparison of the reaction products of Example 6 and the present Example as phases formed upon infiltration by molten metal exhibit similar compositions.

A microstructural analysis of the formed composite body revealed the presence of at least two phases comprising TiN and $TiB_2$.

EXAMPLE 8

The following example demonstrates the formation of a self-supporting body upon reaction between a titanium parent metal and boron nitride bedding.

An approximately 15.75 gram cylindrical ingot of Grade 2 titanium having approximate dimensions of ⅝ inch diameter and ¾ inch high was embedded within about 19.6 grams of −40 mesh boron nitride (Sohio SRG-40) contained within a graphite cup. The graphite cup and its contents were placed within an alumina crucible upon a bedding of 24 grit alumina (38 Alundum, Norton Company).

The assembly, consisting of the alumina crucible and its contents, was placed in a vacuum/inert atmosphere furnace supplied with flowing argon gas at a rate of approximately 1 liter/minute. The temperature was raised from room temperature to about 1750° C. at a rate of about 400° C. per hour, at which time the argon gas was replaced with forming gas (i.e., 96% $N_2$ and 4% $H_2$) flowing at a rate of about 1 liter/minute. The assembly was then maintained at about 1750° C. for about 4 hours, then cooled to room temperature and removed from the furnace.

A visual examination of the sample indicated that the titanium parent metal had reacted with the boron nitride bedding. A powdered sample of the formed composite body was subjected to X-ray diffraction analysis which showed the presence of compounds comprising titanium, boron and/or nitrogen (e.g., $TiB_2$, TiN, $Ti_2N$ and $Ti_3B_4$). The presence of these reaction products confirms that a reaction occurred between the titanium parent metal and the bedding. A sample of the body formed according to this Example was tested for Knoop microhardness by exposing the sample to a 100 g load. The Knoop microhardness was calculated to be about 1411 kg/mm$_2$.

EXAMPLE 9

The following example demonstrates the formation of self-supporting composite bodies upon reaction of titanium parent metal with boron nitride.

An approximately 15.6 gram cylindrical ingot of Grade 2 titanium metal, having approximate dimensions of ⅝ inch diameter and ¾ inch high, was embedded within about 13.8 grams of −325 mesh boron nitride (Sohio SRG-325) contained within a graphite cup. The graphite cup and its contents were placed within an alumina crucible upon a bedding of 24 grit alumina (38 Alundum, Norton Co.).

The assembly, consisting of the alumina crucible and its contents, was placed in a vacuum/inert atmosphere furnace supplied with flowing argon gas at a rate of approximately 1 liter/minute. The temperature was raised from room temperature to about 1750° C. at a rate of about 400° C. per hour, at which time the argon gas was replaced with forming gas (96% $N_2$ and 4% $H_2$) flowing at a rate of about 1 liter/minute. The assembly was maintained at about 1750° C. for about 4 hours, then cooled to room temperature and removed from the furnace.

A visual examination of the sample indicated that the titanium parent metal had reacted with the boron nitride. A powdered sample of the resultant self-supporting body was subjected to X-ray diffraction analysis which showed the presence of compounds containing titanium, boron and/or nitrogen (e.g., $TiB_2$, TiN, and TiB). The presence of these reaction products confirms that a reaction took place between the titanium parent metal and the bedding.

A sample of the body formed according to this Example was tested for Knoop microhardness by exposing the sample to a 100 g load. The Knoop microhardness was calculated to be about 1411 kg/mm$_2$.

EXAMPLE 10

The following Example demonstrates a method for forming self-supporting composite bodies by reacting a parent metal with a solid oxidant in accordance with the instant invention.

Three preforms were formed in the bottom of three Grade ATJ (Union Carbide Corp., Carbon Products Division, Cleveland, Ohio) graphite molds having inner dimensions of about 2 inches (51 mm) long by about 2 inches (51 mm) wide by about 3.25 inches (83 mm) high and having a wall thickness of about 0.25 inch (6.4 mm). A first preform was made by placing about 30 grams of UCAR ® Grade HCJ-325 (particle diameter less than about 45 µm) boron nitride (Union Carbide Corp., Advanced Ceramics, Cleveland, Ohio) and about 15 grams of UCAR ® Grade HCT-30 (average particle diameter of about 10 µm) titanium boride (Union Carbide Corp., Advanced Ceramics, Cleveland, Ohio). Once substantially homogeneously mixed, the BN-TiB$_2$ mixture was placed into the bottom of a second graphite mold. A third preform was formed by hand mixing about 15 grams of UCAR ® Grade HCJ-325 (particle diameter less than about 45 µm) boron nitride (Union Carbide Corp., Advanced Ceramics, Cleveland, Ohio) and about 15 grams TERABOR ® 1000 grit (average particle diameter of about 5 µm) boron carbide (ESK Engineered Ceramics, New Canaan, Ct.). After being substantially homogeneously mixed, the BN-B$_4$C mixture was placed into the bottom of a third graphite mold. The powder mixtures in the graphite molds were consolidated by tap loading the graphite molds and their contents on a tap volume meter (Model 2003, stempfvolumeter, J. Englesmann, West Germany). About 120 grams of −20 mesh, +325 mesh (particle diameter between about 45 µm and about 830 lm) titanium parent metal powder (Chemalloy, Co., Bryn Mawr, Pa.) were placed on top of the preforms in each of the three graphite molds to provide a parent metal powder weight to solid oxidant weight ratio of about 4.0:1. The graphite molds and their contents were placed onto a graphite tray to form a lay-up.

The lay-up and its contents were placed into a vacuum furnace and the furnace door was closed. The vacuum furnace chamber was then evacuated to about $2 \times 10^{-4}$ torr. The vacuum pump was then disengaged from the vacuum furnace chamber and argon was introduced into the vacuum furnace chamber, at a flow rate of at least 10 liters per minute until an overpressure of about 2 pounds per square inch (0.14 kg/cm$^2$) was attained, then the argon flow rate was reduced to about 2 liters per minute. The vacuum furnace and its contents were then heated from about room temperature to about 1800° C. at about 300° C. per hour, held at about 1800° C. for about 10 hours, cooled from about 1800° C. to about room temperature at about 300° C. per hour while maintaining an argon flow rate of about 1 liter per minute at an overpressure of about 2 pounds per square inch (0.14 kg/cm$^2$). At about room temperature, the argon flow rate to the vacuum furnace chamber was interrupted and the lay-up was removed from the vacuum furnace to reveal that the titanium parent metal had reactively infiltrated the preform materials to form ceramic matrix composite bodies.

After removal from the graphite molds, the self-supporting composite bodies were subjected to x-ray diffraction analysis and hardness measurements. Specifically, the results of x-ray diffraction analysis of the composite body formed by the directed reactive infiltration of the titanium parent metal into the boron nitride indicated that the composite body included, among other phases, dititanium nitride (Ti$_2$N), titanium nitride (TiN), titanium monoboride (TiB), titanium (Ti) and titanium diboride (TiB$_2$). The results of microhardness testing using a vickers microhardness indentor applied with a 500 gram load indicated that the hardness of the composite body was about 1413±63 kg/mm$^2$.

Results of x-ray diffraction analysis of the composite body formed by the directed infiltration of the titanium parent metal into the boron nitride-titanium diboride indicated that the ceramic matrix composite body included, among other phases, titanium diboride (TiB$_2$), titanium nitride (TiN) and titanium carbide (TiC). The results of microhardness testing indicated that the hardness of the composite body was about 1420±81 kg/mm$^2$.

Results of x-ray diffraction analysis of the composite body formed by the directed infiltration of the titanium parent metal into the boron nitride-boron carbide indicated that the composite body included, among other phases, titanium monoboride (TiB), dititanium nitride (Ti$_2$N), titanium carbide (TiC), titanium nitride (TiN) and titanium diboride (TiB$_2$). The results of microhardness testing indicated that the hardness of the composite body was about 1284±122.

EXAMPLE 11

The following Example demonstrates the formation of a self-supporting composite bodies by reacting a preform comprising a hafnium parent metal powder and boron nitride.

Four samples of about 46 grams of −325 mesh (particle diameter less than about 45 microns) hafnium parent metal powder (Teledyne Wah Chang Albany, Albany, Oreg.) were each combined with about 0.25 grams of ARCAWAX ® C −325 mesh (particle diameter less than about 45 microns) biasamide wax (Lonza Inc., Fairlawn, N.J.) and about 3.85 grams, about 3.64 grams, about 3.44 grams, and about 3.04 grams, respectively, of UCAR ® Grade HPC (particle diameter less than about 45 microns) boron nitride (Union Carbide Corp., Advanced Ceramics, Cleveland, Ohio). A second group of four preform powder mixtures was made by replacing the UCAR ® Grade HPC boron nitride discussed above with COMBAT ® Grade HTP-325 −325 mesh (particle diameter less than about 45 microns) boron nitride (Carborundum Co., Boron Nitride Division, Amehurst, N.Y.). The eight preform powder mixtures were prepared by combining the above-listed materials into a plastic bottle, securing the lid to the plastic bottle and shaking the plastic bottle, produce a substantially homogeneous mixture. The homogeneous mixture was then placed into a steel die having an inner diameter of about 1 inch (25 mm) and leveled. A ram was contacted with the leveled preform powder mixture and a force of about 7855 pounds was exerted on the ram to produce a pressure of about 10,000 pounds per square inch (703 kg/cm$^2$) on the homogeneous mixture, thereby producing preforms having an outer diameter of about 1 inch (25 mm) and a thickness of about 0.25 inch (6.4 mm). Each preform was placed into a separate graphite mold having an inner diameter of about 1 inch, a height of about 2 inches (51 mm) and a wall thickness of about 0.125 inch (3.2 mm). The graphite molds were machined from Grade ATJ graphite (Union Carbide Corp., Carbon Products Division, Cleveland, Ohio). The bottom of each graphite mold contained three substantially evenly spaced holes therethrough having an inner diameter of about 0.063 inch (1.6 mm). The graphite molds and their contents were then placed into an evacuable furnace and the evacuable furnace door was closed. After the furnace chamber was evacuated, the vacuum pump was disengaged and argon was introduced into the evacuable furnace at a flow rate of about 2 liters per minute. The evacuable furnace and its contents were then heated from about room temperature to about 200° C. in about 2 hours, then from about 200° C. to about 350° C. at about 20° C. per hour, then from about 350° C. to about 670° C. in about 5 hours, and cooled from about 670° C. to about room temperature in about 8 hours, while maintaining an argon flow rate of about 2 liters per minute. At about room temperature, the argon flow rate was interrupted and the graphite molds and their contents were removed from the furnace. It was noted that the bisamide wax binder had been substantially completely removed from the preforms. The eight graphite molds and their contents were then placed into a graphite boat which had a layer of hafnium sponge material substantially completely covering the bottom of the boat. A perforated graphite lid was placed onto the graphite boat and the top of the graphite boat was covered with additional hafnium sponge material as an oxygen getter to remove any residual oxygen within the furnace atmosphere and to complete formation of the lay-up.

The lay-up and its contents were then placed into a vacuum furnace and the vacuum furnace door was closed. The vacuum furnace chamber was then evacuated, filled with argon and evacuated a second time to a pressure of about $2 \times 10^{-4}$ torr. The vacuum furnace and its contents were then heated from about room temperature to about 1000° C. in about 4 hours while maintaining a pressure less than about 60 millitorr. At about 1000° C., the vacuum pump was disengaged from the vacuum chamber and argon was introduced into the vacuum furnace chamber at a flow rate of at least 10 liters per minute until an overpressure of about 2 pounds per square inch (0.14 kg/cm$^2$) was attained, then the argon flow rate was reduced to about 2 liters per minute. The vacuum furnace and its contents were then heated from about 1000° C. to about 2000° C. to about room temperature in about 5 hours, while maintaining an argon flow rate of about 2 liters per minute at an overpressure of about 2 pounds per square inch (0.14 kg/cm$^2$). At about room temperature, the argon flow rate was interrupted, the vacuum furnace door was opened and the lay-up removed. The lay-up was disassembled to reveal that the hafnium parent metal had reacted with each of the eight boron nitride preforms to form self-supporting composite bodies. The phases of the composite bodies were analyzed by x-ray diffraction analysis. The results of x-ray diffraction analysis indicated that the constituents of the composite bodies included, among other phases, hafnium nitride (HFN) and hafnium diboride (HFB$_2$).

What is claimed is:

1. A method for producing a self-supporting body, comprising:
   selecting a parent metal;
   heating said parent metal in a substantially inert atmosphere to a temperature above its melting point to form a body of molten parent metal;
   contacting said body of molten parent metal with a permeable mass comprising boron nitride;
   maintaining said temperature for a time sufficient to permit infiltration of molten parent metal into said permeable mass and to permit reaction of said molten parent metal with said boron nitride to form at least one compound selected from a boron-containing compound and a nitrogen-containing compound; and
   continuing said infiltration and reaction until at least one of said parent metal and said permeable mass is consumed to produce said self-supporting body.

2. A method for producing a self-supporting body, comprising:
   selecting a parent metal;
   heating said parent metal in a substantially inert atmosphere to a temperature above its melting point to form a body of molten parent metal;
   contacting said body of molten parent metal with a permeable mass comprising boron nitride and at least one material selected from the group consisting of boron carbide, a boron donor material, and a carbon donor material;
   maintaining said temperature for a time sufficient to permit infiltration of molten parent metal into said permeable mass and to permit reaction of said molten parent metal with said permeable mass; and
   continuing said infiltration and reaction until at least one of said parent metal and said permeable mass is consumed to produce said self-supporting body.

3. The method of claim 1, further comprising providing a barrier means in contact with at least a portion of a surface of said permeable mass.

4. The method according to claim 1, wherein said parent metal comprises a metal selected from the group of metals consisting of aluminum, titanium, zirconium, hafnium, vanadium, chromium, niobium, tantalum, molybdenum, silicon and tungsten.

5. The method according to claim 2, wherein said parent metal comprises a metal selected from the group of metals consisting of aluminum, titanium, zirconium, hafnium, vanadium, chromium, niobium, tantalum, molybdenum, silicon and tungsten.

6. The method according to claim 3, wherein said parent metal comprises a metal selected from the group of metals consisting of aluminum, titanium, zirconium, hafnium, vanadium, chromium, niobium, tantalum, molybdenum, silicon and tungsten.

7. The method of claim 2, further comprising providing a barrier means in contact with at least a portion of a surface of said permeable mass.

8. The method of claim 3, wherein said barrier means comprises a mold containing at least one through-hole.

9. The method of claim 7, wherein said barrier means comprises a mold containing at least one through-hole.

* * * * *